US006775969B2

(12) United States Patent
Wuebbels et al.

(10) Patent No.: US 6,775,969 B2
(45) Date of Patent: Aug. 17, 2004

(54) FOLDABLE HARVESTING HEADER

(75) Inventors: Richard Wuebbels, Rhede (DE); Norbert Wolters, Gescher (DE)

(73) Assignee: Schinenfabrik Kemper GmbH & Co KG, Breul (DE)

( * ) Notice: Subject to any disclaimer, the term of this patent is extended or adjusted under 35 U.S.C. 154(b) by 0 days.

(21) Appl. No.: 10/230,031

(22) Filed: Aug. 27, 2002

(65) Prior Publication Data

US 2003/0041579 A1 Mar. 6, 2003

(30) Foreign Application Priority Data

Sep. 1, 2001 (DE) .......................................... 101 42 978

(51) Int. Cl.$^7$ .............................................. A01D 67/00
(52) U.S. Cl. ................................. 56/208; 56/51; 56/219
(58) Field of Search ............................ 56/51, 208, 210, 56/219, 220, 221, 228

(56) References Cited

U.S. PATENT DOCUMENTS

| 2,636,331 A | | 4/1953 | Price ............................ 56/122 |
| 3,345,808 A | * | 10/1967 | Van Der Lely ............... 56/208 |
| 3,468,107 A | * | 9/1969 | Van Der Lely .............. 56/11.9 |
| 4,409,780 A | * | 10/1983 | Beougher et al. ............. 56/228 |
| 4,446,682 A | | 5/1984 | Jennen et al. ................. 56/119 |
| 4,487,004 A | * | 12/1984 | Kejr ............................. 56/228 |
| 5,329,753 A | | 7/1994 | Arnold et al. .................. 56/98 |
| 5,673,543 A | | 10/1997 | Richardson et al. ........... 56/85 |
| 5,865,019 A | | 2/1999 | Hurlburt et al. .............. 56/119 |
| 5,911,625 A | * | 6/1999 | von Allworden ........... 460/119 |
| 2002/0014064 A1 | | 2/2002 | Wubbels et al. ............... 56/95 |

FOREIGN PATENT DOCUMENTS

| CH | 440 802 | | 1/1968 |
| DE | 2 026 190 | | 12/1970 |
| DE | 36 14 498 A1 | | 11/1987 |
| DE | 38 28 293 | | 1/1990 |
| DE | 3906456 A1 | * | 9/1990 |
| DE | 41 42 496 C2 | | 6/1993 |
| DE | 199 33 779 | | 2/2001 |
| EP | 0 131 853 | | 1/1985 |
| EP | 0 471 961 A1 | | 2/1992 |
| EP | 0491 405 A1 | | 6/1992 |
| EP | 0 553 506 A1 | | 8/1993 |
| EP | 0992187 A1 | * | 8/1999 |
| EP | 1046329 A2 | * | 4/2000 |

* cited by examiner

Primary Examiner—Robert E. Pezzuto
Assistant Examiner—Nathan Mammen

(57) ABSTRACT

A harvesting header for a self-propelled harvesting machine comprising a center portion and two side portions. The center portion and both side portions are provided with forwardly extending crop processing arrangements. A transversely extending auger is located behind the crop processing arrangements. The crop processing arrangements can be moved between an operating position and a transport position by pivoting them about a transversely extending horizontal pivot axis. In this transport position the center of gravity of the harvesting header is moved rearwardly towards the harvesting machine. The side crop processing arrangements can be pivoted about forwardly extending pivot axes to reduce the width of the harvesting header in its transport position.

13 Claims, 2 Drawing Sheets

FOLDABLE HARVESTING HEADER

FIELD OF THE INVENTION

The present invention is directed to a foldable harvesting header that can be shifted between an operating position and a transport position by pivoting about a predominantly horizontal pivot axis.

BACKGROUND OF THE INVENTION

Harvesting headers for self-propelled harvesting machines have been getting wider and wider, permitting farmers to harvest fields in shorter time with fewer passes through the field. However, the maximum width of vehicles operated on public roads is limited by law. For that reason the headers are transported as a rule on a trailer, or folded into a transport position, in which its width is reduced compared to its operating position. Folding a harvesting header has the advantage that the removal and reassembly of the header from or to the harvesting machine is eliminated.

U.S. Pat. No. 5,329,753 discloses a corn head for a forage harvester in which the outer parts of the header can be folded upward about horizontal axes extending in the direction of operation, and are laid over the central part of the corn harvesting implement. This concept can be found relatively often.

DE 199 33 779 C discloses a harvesting header be divided at its center and the outer ends of the halves be folded inward and upward about horizontal axes extending in the direction of operation.

DE 38 28 293 C discloses a harvesting header in which the outer parts are pivoted into a position about an axis extending inclined upward and outward in which they come to lie ahead of and above the center part. In another embodiment the outer parts are positioned by a two-legged pivoting mechanism above the center part.

Furthermore, EP 0 131 853 B describes a corn head in which the intake points without the stripper devices are folded upward about a horizontal axis extending transverse to the direction of operation. The outer parts are pivoted upward about axes extending transverse to the direction of operation, as is described in DE 41 31 491 A.

In the harvesting headers described above, the disadvantage is that the center of gravity during transport is located relatively far forward. Except for the corn head described in EP 0 131 853 B in which the intake points of the plucking devices that have been folded upward that relocate the center of gravity when folded only slightly to the rear, the position of the center of gravity is not changed by the folding of the crop processing arrangement of the harvesting headers. For this reason detrimental high loads develop during transport on public roads that are applied to the front wheels of the harvesting machine carrying the harvesting header.

SUMMARY OF THE INVENTION

It is an object of the present invention to provide an improved foldable harvesting header.

The harvesting header is provided with at least one crop processing arrangement that can be pivoted between an operating position and a transport position about a predominantly horizontal pivot axis. The pivot axis extends transverse to the direction of operation. In the operating position the crop processing arrangement of the harvesting header is arranged in its known position above the field to be harvested and extending forwardly from the self-propelled harvesting machine. In the transport position the crop processing arrangement is pivoted upward and to the rear, opposite to the direction of operation.

As such, the center of gravity of the harvesting header in the transport position moves rearwardly closer to the harvesting machine carrying the harvesting header.

The harvesting header is subdivided into a center portion and one or two side portions arranged alongside the center portion in the operating position relative to the direction of forward operation. These side portions are pivotally coupled to the center portion. The side portions can be pivoted about two forwardly extending pivot axes. The side portion can be pivoted upward to reduce the width of the harvesting header in its transport position. In the transport position the side portions extend either approximately vertically upward so that the operator of the harvesting machine can look between them (or past them) to see the road, or they are laid on top of the center portion that has been folded upward and to the rear, so that the side portions extend parallel to the center portion. It would also be conceivable to bring the side portions into the transport position by a pivot linkage of the type disclosed in DE 38 28 293 C. That is the side portions could be pivoted about an axis extending at an angle outward and upward into a position in which it is located above the center portion, or could be pivoted by a two-legged pivoting mechanism above the center portion. Furthermore it would be possible that the side portions are not pivoted upward and rearward with the center portion, but remain in their operating positions until the center portion has been pivoted upward and rearwardly and then the side portions are slid beneath the center portion.

Many types of harvesting headers are equipped with transverse augers or other transverse conveyors, for example, conveyor bands or roll conveyors that are arranged downstream of the crop processing arrangement at the rear of the harvesting header. As a rule these transverse conveyors are not pivoted with crop processing arrangements about a pivot axis into a transport position, but remain stationary. They may be fastened rigidly to the rear frame, which has the advantage that the pivoting drive must move smaller masses and therefore can be dimensioned to a smaller size. In a preferred embodiment of the invention, the pivot axis coincides with the axis of rotation of the transverse auger.

DETAILED DESCRIPTION

Figure 1:
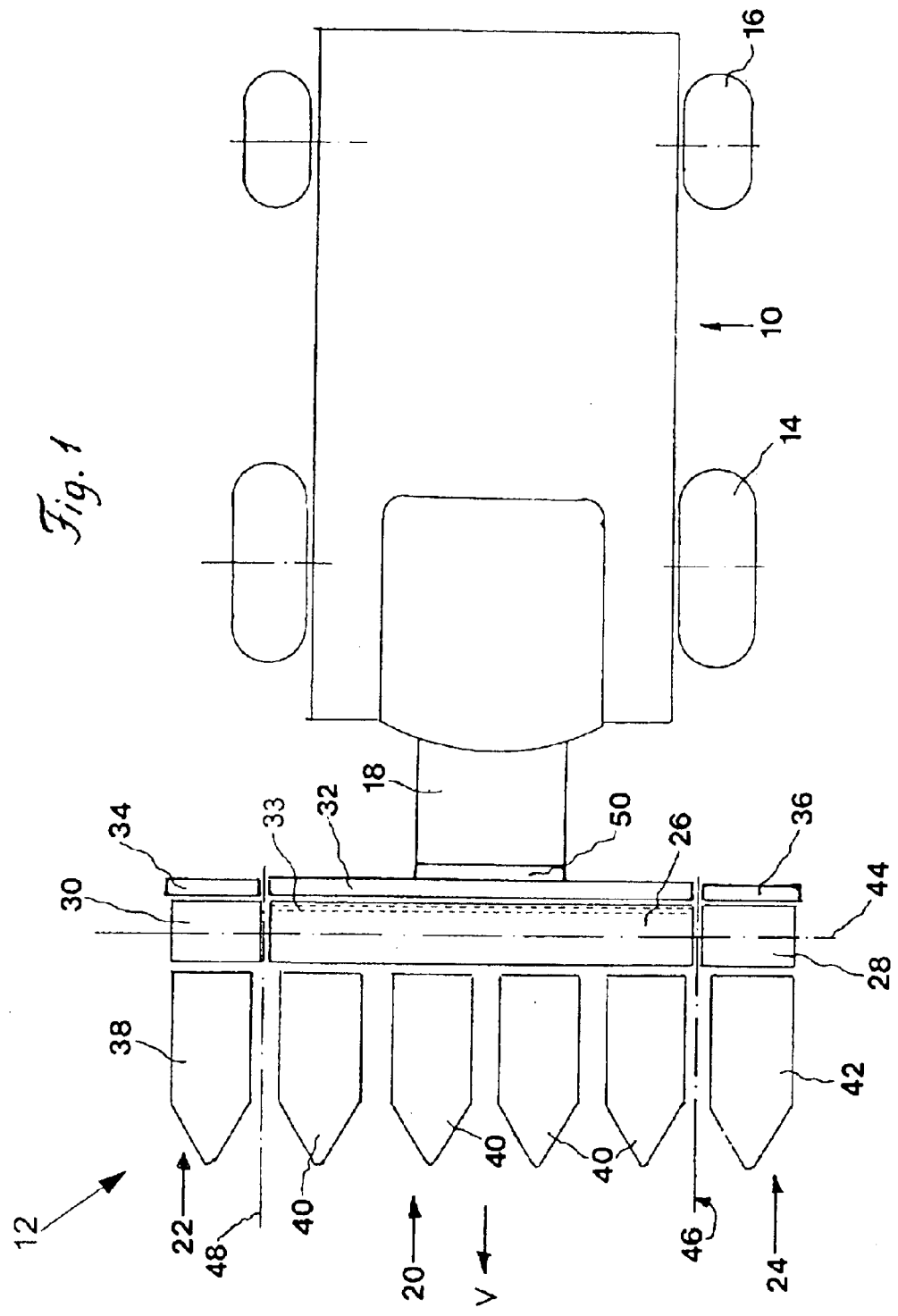
FIG. 1 shows a top view of a harvesting machine with a harvesting header according to the invention in its operating position.

FIG. 1 shows a self-propelled harvesting machine 10 in the form of a combine. It is supported on the field by front driven wheels 14 and rear steerable wheels 16. The front of the harvesting machine 10 is provided with a feeder house 18 on which a harvesting header 12 is mounted. The harvesting header illustrated in FIG. 1 is a corn head. The harvesting machine 10 is arranged to move the harvesting header 12 in a forward operating direction V over a field that is being harvested. Although the harvesting machine 10 is illustrated as being propelled on wheels, it can also be propelled by a full track assembly or a half track assembly.

The harvesting header 12 comprises a center portion 20 and two side portions 22 and 24. The side portions 22 and 24 are arranged on both sides of the center portion 20 relative to the forward operating direction V. The center portion 20 is suspended on a pivoting mounting plate 50 that is attached to the front of the feeder house 18. The center portion 20 is provided with a number of center crop processing arrangements 40. As illustrated in FIG. 1, four center crop processing arrangements 40 are arranged alongside each other. Each of the crop processing arrangements 40 would be provided with gathering chains and stripper rolls. It would also be conceivable that gathering and stripping arrangements could be similar to those disclosed in U.S. Publication 2002/0014064 published Feb. 7, 2002, whose disclosure is incorporated herein by reference. Within the framework of the concept of the invention the type of the crop processing arrangement 40 may be any desirable type and could also include cotton picking arrangements, drums of corn heads or other desirable harvesting arrangements. A center transverse auger 26 is located behind the crop processing arrangements 40. A first rigid frame 32 is supported on the pivoting mounting plate 50. A second frame 33 is pivotally mounted on the first frame 32. The frame 32 is provided in its outer region (as seen in the forward operating direction V) with an element on which both ends of the center transverse auger 26 is rotatively supported. At that location the second frame 33, that can be pivoted, is also connected in a joint, which, in turn, also retains the center crop processing arrangements 40. The second frame 33 with the crop processing arrangements 40 can be pivoted upward by means of appropriate pivoting devices about the longitudinal axis of the center transverse auger 26 while the first frame 32 is fastened rigidly to the pivoting mounting plate 50. The first and/or the second frame 32 and/or 33 retain pans that partially enclose the center transverse auger 26, that make possible the conveying of the crop into the harvesting machine 10 through feeder house 18 by the center transverse auger 26.

The side portions 22 and 24 arranged on each side of the center portion 20 are each provided with side crop processing arrangements 38 and 42, respectively. Typically, the side crop processing arrangements 34 and 36 are configured the same as the center crop processing arrangements 40. The rear of the side crop processing arrangements 38 and 42 communicate with side transverse augers 28 and 30, respectively. The side transverse augers 28 and 30 extend coaxially to the center transverse auger 26. The side portions 22 and 24 are supported on side frames 34 and 36, respectively, located to the rear of the side crop processing arrangements. The side frames 34 and 36 are equipped with elements which rotatively support one or both ends of the side transverse augers 28 and 30. The side frames 34 and 36 are also provided with pans for conveying the harvested crop to the center portion 20 of the harvesting header 12. The pans are located beneath and to the rear of the side transverse augers 28 and 30. The transverse augers 26, 28 and 30 can be driven to rotate about a common axis 44 and are connected with each other by releasable couplings that transmit torque from one transverse auger to the other. The crop processing arrangements 38, 40 and 42 and the transverse augers 26, 28 and 30, are driven by a drive located on the feeder house 18 of the harvesting machine 10. In the operating position the side frames 34, 36 of the side portions 22 and 24 are supported by the frame 32 of the center portion 20.

Figure 2:
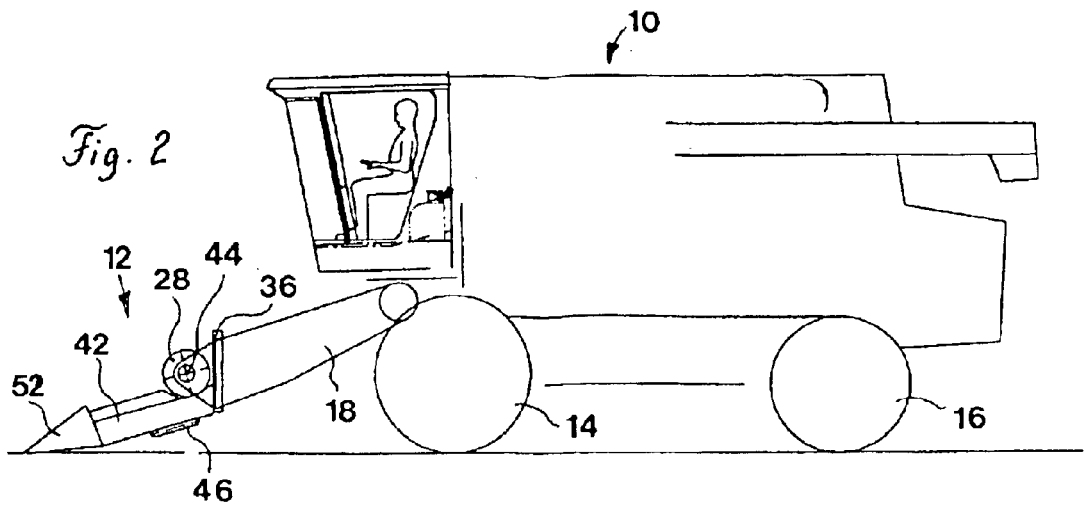
FIG. 2 shows a side view of the harvesting machine of FIG. 1.

The center crop processing arrangement 40 and the entire side portions 22 and 24 are pivotally supported in bearings. The bearings defining an axis that coincides with the axis 44 of the transverse augers 26, 28 and 30. The axis extends in the horizontal direction transverse to the forward operating direction V. Furthermore, the side portions 22 and 24 are pivotally supported in bearings defining forwardly extending axes 46 and 48 that extend in the forward operating direction V—as can be seen in FIG. 2 and parallel to the underside of the crop processing arrangements 38, 40 and 42. The forwardly extending axes are inclined forward and downward. The side portions are coupled to pivot joints that are also coupled to the center portion 20. For the pivoting of the center and side portions 20, 22 and 24 about axis 44 and the side portions 22 and 24 about the forwardly extending pivot axes 46 and 48, drives are provided, which are not shown in the figures for reasons of clarity. These drives would typically be formed by hydraulic cylinders or other suitable linear actuators that are driven by the harvesting machine 10. A hydraulic cylinder can pivot the second frame 33 of the center portion 20 with the crop processing arrangements 40 together with the side portions 22 and 24 coupled to the second frame 33 about the axis 44. Additional hydraulic cylinders would rotate the side portions 22 and 24 about the forwarding extending pivot axes 46 and 48.

During a harvesting operation, the harvesting machine 10 moves the harvesting header 12 over the field. The crop processing arrangements 38, 40 and 42 each harvest six rows of the corn plants standing on the field and separate the corn cobs from the remains of the plants. The remains of the plants are chopped or deposited complete on the field, the corn cobs are conducted by the transverse augers 26, 28 and 30 to the feeder house 18. The feeder house 18 conveys the corn cobs into the interior of the harvesting machine, where they are further processed.

FIG. 2 reproduces a side view of the harvesting machine 10 with the harvesting header 12. The crop processing arrangement 42 of the left side portion 24 that can be seen in the figure extends at an angle from the transverse auger 28 towards the front and downward so that a divider point 52 contacts the ground.

Figure 3:
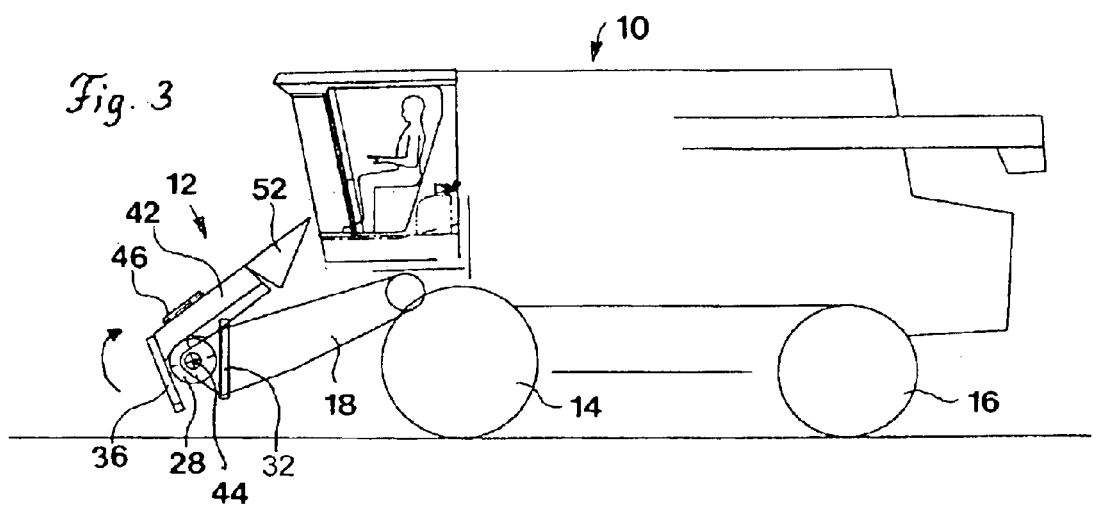
FIG. 3 shows a side view of the harvesting machine with a harvesting header pivoted upward about a horizontal axis extending transverse to the forward direction of operation.

FIG. 3 illustrates a side view of the harvesting machine 10, in which the center and side portions 20, 22 and 24 with the crop processing arrangements 38, 40 and 42 are pivoted in the clockwise direction as indicated by the arrow upward and rearwardly about the horizontal axis 44. The crop processing arrangements 38, 40 and 42 now extend from the transverse augers 26, 28 and 30 and are inclined at an angle upward and to the rear. The center of gravity of the mass of the harvesting header 12 has thereby been repositioned considerably to the rear.

Figure 4:
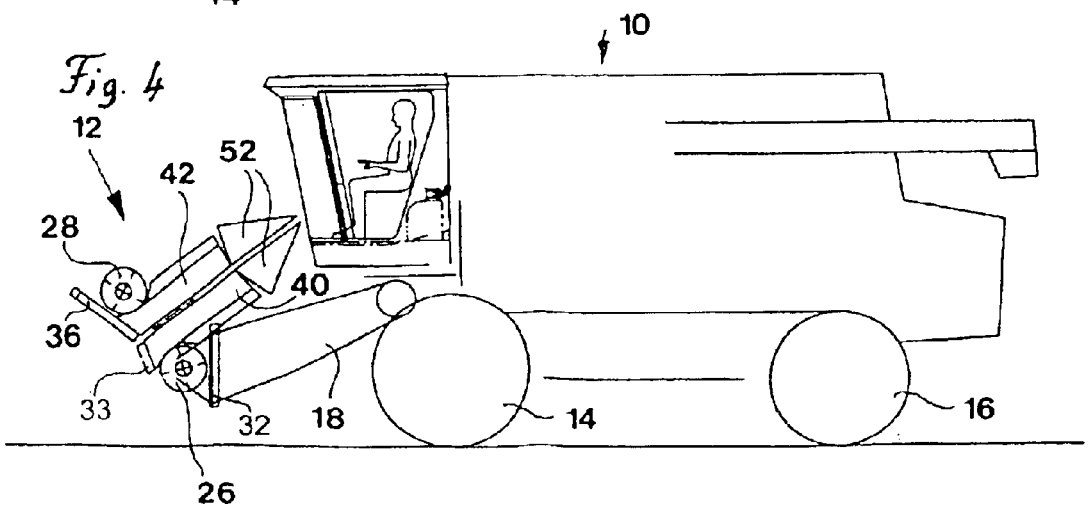
FIG. 4 shows a side view of the harvesting machine with a harvesting header brought into the transport position.

In the position shown in FIG. 3, the width of the harvesting header 12 has not been changed in comparison with the operating position, as it is shown in FIGS. 1 and 2. In the configuration illustrated in FIGS. 2 and 3 the harvesting machine would only be transported to a limited degree, for example, across fields or on public roads with no width limitations. In order to reduce the width of the harvesting header 12 the side portions forwardly extending pivot axes 46, 48 are provided. In FIG. 4 the harvesting header 12 is shown in its transport position, in which the side portions 22 and 24 are folded inwardly approximately 180° and come to rest upon the center portion 20. The center of gravity of the harvesting header 12 is repositioned forward to a slight degree compared to that of FIG. 3, but is still located considerably further to the rear compared to harvesting headers in which only the side parts are pivoted upward and inward about axes extending in the forward operating direction.

Having described the preferred embodiment, it will become apparent that various modifications can be made without departing from the scope of the invention as defined in the accompanying claims.

What is claimed is:

1. A harvesting header for a self-propelled harvesting machine, the harvesting header having a crop processing arrangement that can be moved over a field in a forward operating direction, the harvesting header is provided with a transversely extending auger having an axis of rotation, the crop processing arrangement can be pivoted about a transversely extending pivot axis between an operating position and a transport position, the transversely extending pivot axis is transverse to the forward operating direction, wherein the axis of rotation of the transversely extending auger is substantially aligned with the transversely extending pivot axis.

2. A harvesting header as defined by claim 1 comprising several crop processing arrangements, one of the crop processing arrangements being a center crop processing arrangement and another crop processing arrangement being a side crop processing arrangement arranged transversely alongside the center crop processing arrangement when the harvesting header is in its operating position.

3. A harvesting header as defined by claim 2 comprising two side crop processing arrangements that are arranged on both sides of the center crop processing arrangement when the harvesting header is in its operating position.

4. A harvesting header as defined by claim 3 wherein the two side crop processing arrangements can be pivoted about two forwardly extending pivot axes relative to the center crop processing arrangement.

5. A harvesting header as defined by claim 4 wherein when the center crop processing arrangement is pivoted into its transport position about the transversely extending pivot axis, the two side crop processing arrangements can be pivoted about the two forwardly extending pivot axes, the forwardly extending pivot axes extending at least partially in the forward operating direction.

6. A harvesting header as defined by claim 5 wherein the side crop processing arrangements are arranged above the center crop processing arrangement when they are in their transport position.

7. A harvesting header as defined by claim 6 wherein when the side crop processing arrangements are arranged in their transport position they are substantially parallel to the center crop processing arrangement.

8. A harvesting header as defined by claim 7 wherein the center crop processing arrangement has a center rear region and the two side crop processing arrangements each have a side rear region, the transversely extending auger extending across the center rear region and the side rear regions, the center crop processing arrangement and the two side crop processing arrangements can be pivoted about the transversely extending pivot axis relative to the transversely extending auger.

9. A harvesting header as defined by claim 2 wherein the side crop processing arrangement can be pivoted about a forwardly extending pivot axis relative to the center crop processing arrangement.

10. A harvesting header as defined by claim 9 wherein when the center crop processing arrangement is pivoted into its transport position about the transversely extending pivot axis, the side crop processing arrangement can be pivoted about the forwardly extending pivot axis, the forwardly extending pivot axis extending at least partially in the forward operating direction.

11. A harvesting header as defined by claim 10 wherein the side crop processing arrangement is arranged above the center crop processing arrangement when the side crop processing arrangement is in its transport position.

12. A harvesting header as defined by claim 11 wherein when the side crop processing arrangement is arranged in its transport position they are substantially parallel to the center crop processing arrangement.

13. A self-propelled harvesting machine having ground engaging means to propel the harvesting machine in a forward direction of travel, the harvesting machine having a forwardly extending feeder house, a harvesting header is mounted to the feeder house, the harvesting header having forwardly extending crop processing arrangements, the crop processing arrangements can be pivoted about a transversely extending pivot axis between an operating position and a transport position, the transversely extending pivot axis being transverse to the forward operating direction, the crop processing arrangements comprise a center crop processing arrangement and two side crop processing arrangements, the two side crop processing arrangements being arranged transversely alongside the center crop processing arrangement when the harvesting header is in its operating position the two side crop processing arrangements can be pivoted about two forwardly extending pivot axes relative to the center crop processing arrangement, when the center crop processing arrangement is pivoted into its transport position about the transversely extending pivot axis, the two side crop processing arrangements can be pivoted about the two forwardly extending pivot axes, the side crop processing arrangements are arranged above the center crop processing arrangement when they are in their transport position, when the side crop processing arrangements are arranged in their transport position they are substantially parallel to the center crop processing arrangement, the center crop processing arrangement has a center rear region and the two side crop processing arrangements each have a side rear region, the transversely extending auger extending across the center rear region and the side rear regions, the center crop processing arrangement and the two side crop processing arrangements can be pivoted about the transversely extending pivot axis that is coaxial with the axis of rotation of the transversely extending auger.

* * * * *